US012743581B2

(12) United States Patent
Narayana et al.

(10) Patent No.: US 12,743,581 B2
(45) Date of Patent: Sep. 22, 2026

(54) USING GENERATIVE ARTIFICIAL INTELLIGENCE TO EDIT IMAGES BASED ON CONTEXTUAL DATA

(71) Applicant: Google LLC, Mountain View, CA (US)

(72) Inventors: Pradyumna Narayana, Bothell, WA (US); Garima Pruthi, San Jose, CA (US)

(73) Assignee: Google LLC, Mountain View, CA (US)

( * ) Notice: Subject to any disclaimer, the term of this patent is extended or adjusted under 35 U.S.C. 154(b) by 204 days.

(21) Appl. No.: 18/815,790

(22) Filed: Aug. 26, 2024

(65) Prior Publication Data

US 2025/0078361 A1 Mar. 6, 2025

Related U.S. Application Data

(60) Provisional application No. 63/536,212, filed on Sep. 1, 2023.

(51) Int. Cl.

| | |
|---|---|
| ***G06T 11/60*** | (2026.01) |
| ***G06F 40/279*** | (2020.01) |
| ***G06F 40/40*** | (2020.01) |
| ***G06T 7/194*** | (2017.01) |

(52) U.S. Cl.

CPC ............ *G06T 11/60* (2013.01); *G06F 40/279* (2020.01); *G06F 40/40* (2020.01); *G06T 7/194* (2017.01); *G06T 2207/20084* (2013.01)

(58) Field of Classification Search

CPC ....... G06F 40/279; G06F 40/40; G06T 7/194; G06T 11/60; G06T 2207/20084

See application file for complete search history.

(56) References Cited

U.S. PATENT DOCUMENTS

2008/0019574 A1* 1/2008 Scalise ...................... G06T 7/11 382/282
2008/0019575 A1* 1/2008 Scalise .................... G06T 7/194 382/118

(Continued)

OTHER PUBLICATIONS

Adiwardana et al., "Towards a human-like open-domain chatbot" CoRR, Submitted on Feb. 2020, arXiv:2001.09977v3, 38 pages.

(Continued)

*Primary Examiner* — Cory A Almeida
(74) *Attorney, Agent, or Firm* — Fish & Richardson P.C.

(57) ABSTRACT

Methods, systems, and apparatus, including computer programs encoded on a computer storage medium, for enabling artificial intelligence to generate new images based on contextual data and to generate digital components based on the images. In one aspect, a method includes receiving one or more queries from a client device of a user. A digital component is selected based on the one or more queries. A customized digital component is generated by obtaining an image of an object corresponding to the selected digital component and generating, using a language model, an image editing prompt for editing the image based on digital component data related to the digital component and query data including the one or more queries and contextual data. The image and the image editing prompt are provided to an image editing model. An edited image is received and used to generate the customized digital component.

17 Claims, 4 Drawing Sheets

(56) References Cited

U.S. PATENT DOCUMENTS

| | | | | |
|---|---|---|---|---|
| 2012/0025462 | A1* | 2/2012 | Knowlton | A63F 9/10<br>273/153 R |
| 2012/0098994 | A1* | 4/2012 | Cheatle | G06T 11/60<br>348/222.1 |
| 2016/0188574 | A1* | 6/2016 | Homma | G06F 40/35<br>704/9 |
| 2019/0206105 | A1* | 7/2019 | Martin | G06F 8/38 |
| 2022/0084201 | A1* | 3/2022 | Dai | G06N 3/04 |
| 2022/0139013 | A1* | 5/2022 | Zhang | G06T 11/60<br>345/589 |
| 2023/0092247 | A1* | 3/2023 | SayyarRodsari | G06T 7/0004<br>700/109 |
| 2023/0153527 | A1* | 5/2023 | Puri | G06F 40/30<br>704/9 |
| 2023/0334754 | A1* | 10/2023 | Kirchmayer | G06T 15/04 |
| 2023/0401247 | A1* | 12/2023 | Lehal | G06Q 10/10 |
| 2023/0418848 | A1* | 12/2023 | Clinchant | G06F 40/40 |
| 2024/0394887 | A1* | 11/2024 | Qin | G06T 7/11 |
| 2025/0005806 | A1* | 1/2025 | Mondal | G06N 3/045 |

OTHER PUBLICATIONS

Brown et al., "Language models are few-shot learners" CoRR, Submitted on Jul. 2020, arXiv:2005.14165v4, 75 pages.

Hoffmann et al., "Training compute-optimal large language models" CoRR, Submitted on Mar. 2022, arXiv:2203.15556v1, 36 pages.

Rae et al., "Scaling language models: Methods, analysis & insights from training gopher" CoRR, Submitted on Dec. 2021, arXiv:2112.11446v1, 118 pages.

Raffel et al., "Exploring the limits of transfer learning with a unified text-to-text transformer" CoRR, Submitted on Sep. 2023, arXiv:1910.10683v4, 67 pages.

* cited by examiner

USING GENERATIVE ARTIFICIAL INTELLIGENCE TO EDIT IMAGES BASED ON CONTEXTUAL DATA

CROSS-REFERENCE TO RELATED APPLICATION

This application claims priority to U.S. Provisional Application No. 63/536,212, filed on Sep. 1, 2023. The disclosure of the prior application is considered part of and is incorporated by reference in the disclosure of this application.

BACKGROUND

This specification relates to data processing, artificial intelligence, and generating images using artificial intelligence.

Advances in machine learning are enabling artificial intelligence to be implemented in more applications. For example, large language models have been implemented to allow for a conversational interaction with computers using natural language rather than a restricted set of prompts. This allows for a more natural interaction with the computer.

SUMMARY

In general, one innovative aspect of the subject matter described in this specification can be embodied in methods that include the actions of receiving one or more queries from a client device of a user. A digital component is selected based on the one or more queries. A customized digital component for the user. The generating includes obtaining an image of an object corresponding to the selected digital component; generating, using a language model, an image editing prompt for editing the image based on (i) digital component data related to the digital component and (ii) query data including the one or more queries and contextual data that characterizes a context in which the one or more queries are received from the client device; providing the image and the image editing prompt to an image editing model that is trained to edit images based on input prompts and input images; receiving, from the image editing model, an edited image; and generating the customized digital component using the edited image. The customized digital component is sent to the client device of the user. Other implementations of this aspect include corresponding apparatus, systems, and computer programs, configured to perform the aspects of the methods, encoded on computer storage devices.

These and other embodiments can each optionally include one or more of the following features. Some aspects include generating an image mask by masking a background depicted in the image. Providing the image and the image editing prompt to the image editing model can include providing, as the image, the image mask to the image editing model.

In some aspects, generating the image mask includes providing the image to a foreground segmentation neural network trained to segment foreground objects from backgrounds in images and receiving the image mask from the foreground segmentation neural network.

In some aspects, the one or more queries include past queries from one or more past user sessions of the user, current queries from a current user session of the user, or both.

In some aspects, the data related to the digital component includes distribution parameters for the digital component.

The distribution parameters can include one or more keywords, one or more geographic locations, or both.

In some aspects, the data related to the digital component includes a caption depicted in the image.

In some aspects, the contextual data includes at least one of a geographic location of the client device or one or more interests of the user.

Some aspects include post processing the customized digital component prior to sending the customized digital component to the client device. The post processing can include detecting one or more errors in the edited image and updating the edited image to correct the one or more errors prior to generating the customized digital component using the edited image.

In some aspects, generating, using the language model, an image editing prompt includes providing, to the language model, a prompt generation prompt that includes instructions for generating the image editing prompt and a set of concepts identified from the digital component data and the query data.

In some aspects, the prompt generation prompt includes a caption of the image.

In some aspects, generating, using the language model, an image editing prompt includes identifying the set of concepts including first concepts based on the digital component data and a second concepts based on the query data.

Some aspects include identifying mismatching concepts between the first concepts and the second concepts and filtering the mismatching concepts from the set of concepts.

In some aspects, filtering the mismatching concepts includes filtering only a portion of the mismatching concepts based on a level of importance of each mismatching concept.

Particular embodiments of the subject matter described in this specification can be implemented so as to realize one or more of the following advantages. The techniques described in this document enable artificial intelligence (AI) to be used to generate customized content, e.g., customized images and/or digital components, for a user based on data related to the digital component and the user, e.g., one or more queries received from the user and/or other contextual data. Using this combination of data, an AI system can generate customized content that accurately shows an item that is the subject of a digital component in a context that is relevant to the user and/or the user's informational needs. By evaluating concepts related to the digital component and concepts related to the queries, the AI system can identify important overlapping concepts and generate an image that includes or conveys those concepts with an image of the item. Absent the described techniques, a digital component provider would have to generate and/or store a substantial number of images of the item for the different contextual environments that correspond to different combinations of query data.

For example, the query data can include location data that indicates a location of a user that submitted the queries. The AI system can generate digital components that include a background image that corresponds to that location and include an image of the item in front of or otherwise within that background. Absent the use of the techniques described herein, a digital component provider would be required to generate digital components with the appropriate background for every relevant location and send those to a system that distributes the digital components. Using the described techniques, the amount of bandwidth that would be required to transmit the large number of digital components to the distribution system and the data storage requirements for storing all of the images is eliminated. This improves the performance of the network (e.g., by reducing bandwidth consumption and related latency) and frees data storage space for other data or allows for less capacity data storage in the system.

The described techniques also enable images to be edited at query time, which allows for more up to date information to be used in the image editing process, resulting in enhanced accuracy in the image content. For example, weather information that shows current weather conditions in the user's location can be used to generate a background with similar weather. In another example, a query corresponding to a particular aspect of an item can be used after receiving the query to highlight that aspect of the item in the background image. Using the described techniques and machine learning models, the images can be generated much faster and more efficiently than humans or systems that do not utilize such machine learning models, thus enabling the images to be created at query time and within the milliseconds required to respond to the query without the need to consume large amounts of data storage to store pre-generated images.

The image editing processes can be broken down into multiple operations to enhance the input provided to the image editing model, which results in higher quality images without (or with reduced hallucinations). For example, rather than provide queries and/or contextual data directly to an image editing model, the queries and/or contextual data can be analyzed (e.g., using a language model) to identify concepts related to the queries and/or context. The concepts can then be used to edit the image rather than a large number of queries and/or large amount of contextual data. Using more focused data prevents hallucinations and other errors that can result from the use of AI models to generate images.

In addition, the prompts described in this document can be configured to properly constrain the models to provide high quality output images. This provides fine-tuned control over the parameters of the models and the outputs of the models, resulting in higher quality images and less processing.

The image editing processes provide a particular way to achieve the generation of customized images that convey concepts of queries and/or other contextual data. For example, the image editing processes can use an AI model to generate an image editing prompt based on the queries and contextual data and that prompt can then be used by an AI model to edit an image. This enables the prompt to be properly configured to constrain the AI model to generate high quality images that take into account the queries and contextual data.

Image pre-processing techniques can be used to identify an object that is the subject of the digital component in the image and to mask the background of the original image. Masking the image in this way can prevent unwanted artifacts being introduced into the edited image due to the inclusion of unwanted background content remaining in the image. These pre-processing techniques can be used to preserve the fidelity of the object and to only remove the portions from the image that will be regenerated. Thus, the image editing processes can include multiple stages that are all configured to cause AI models to generate high quality edited images.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
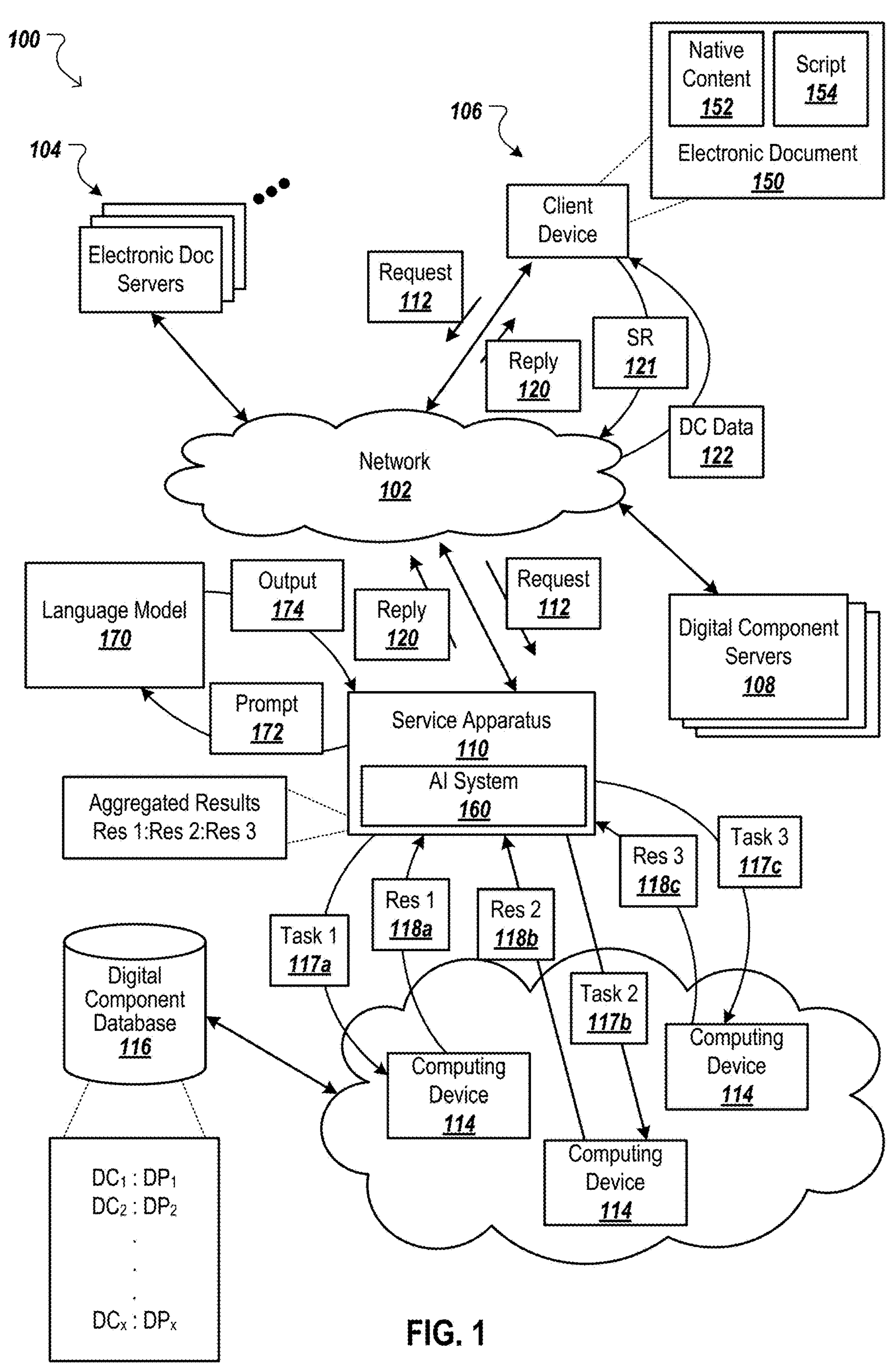
FIG. 1 is a block diagram of an example environment in which customized digital component generation can be performed.

This specification describes techniques for enabling artificial intelligence to generate new image-based digital components that are specific to a particular contextual environment based on one or more queries submitted by a user, contextual data related to the queries, and/or data related to the digital component. Artificial intelligence (AI) is a segment of computer science that focuses on the creation of models that can perform tasks autonomously (e.g., with little to no human intervention). Artificial intelligence systems can utilize, for example, one or more of machine learning, natural language processing, or computer vision. Machine learning, and its subsets, such as deep learning, focus on developing models that can infer outputs from data. The outputs can include, for example, predictions and/or classifications. Natural language processing, focuses on analyzing and generating human language. Computer vision focuses on analyzing and interpreting images and videos. Artificial intelligence systems can include generative models that generate new content, such as images, videos, text, audio, and/or other content, in response to input prompts and/or based on other information.

The techniques described throughout this specification enable AI to generate customized digital components using images corresponding to the digital components, other digital component data related to the digital components, and/or query data for one or more queries submitted by a user. An AI system can receive a query from a client device of a user, select a digital component to provide to the client device in response to the query, and interact with one or more machine learning models to edit an image based on the digital component data and the query data. The query data can include each of the one or more queries and/or contextual data that characterizes a context in which each query is received from the client device. For example, the contextual data can include the location of the client device and the one or more machine learning models can be used to generate a background based on the location and to depict an item corresponding to the digital component in the generated background.

Generally speaking, the AI system can generate a prompt based on the information and provide the prompt as input to a language model, such as a large language model (LLM), that outputs an image editing prompt for an image editing model, e.g., a text-to-image model. As discussed in more detail below, the prompt for generating the image editing prompt is specialized (e.g., created or augmented) to improve the overall quality of the customized image generated by the image editing model by taking into account the query data and the digital component data. Post-processing operations are then used to detect errors associated with generating the customized digital component, and the customized digital component can be output to a client device (e.g., user computer, mobile device, tablet device, audio device, gaming device, etc.).

Using the specialized prompt that includes data related to queries and/or digital components reduces wasted computing resources that would otherwise generate more low quality digital components if a more general prompt was used or if multiple prompts related to different concepts (e.g., some for query data and others for digital component data) were used. Similarly, using the specialized prompt to generate an image editing prompt for creating a customized digital component based on query data and digital component data can save computing resources and result in generating an output faster by using the specialized prompt to constrain the parameters used by the language model to generate the image. For example, the data included in the prompt can be constrained to matching concepts between the query data and the digital component data such that less relevant data is not processed by the language model. This reduces the amount of processing performed using the language model and results in higher quality image editing prompts that result in higher quality images for the customized digital components. Using a single prompt that is based on both query data and digital component data enables the use of a single high quality prompt that reduces computational resources that would be required for multiple prompts and enables the language model to create and image editing prompt that better conveys the concepts of both the query data and the digital component data.

For example, by using a language model to construct the image editing prompt based on digital component data (e.g., a caption of an image corresponding to the digital component, a caption generated by the system, provider information related to a digital component provider that provides the digital component, etc.) and query data (e.g., one or more queries and contextual data, e.g., device location, user interests, etc.), the image editing model will generate a specialized image based on the image editing prompt without the system having to generate multiple prompts for each of the inputs, thereby avoiding the creation of unwanted images for multiple prompts, which reduces the time required to generate the images, the memory required to store the images, and the computing resources required to generate and evaluate the images. By evaluating concepts related to the digital component data and the query data, the system can generate, for the language model, prompts that align both the intent of the user and the intent of the digital component provider (e.g., by identifying matching concepts and removing mismatching concepts). This all contributes to a system capable of creating new images that convey a digital component provider's message accurately in the user's context faster, such that they can be created and served in a real time interactive environment—e.g., in response to a user search query.

In some implementations, the AI system performs pre-processing techniques on the image and post-processing techniques on the created digital component to improve the quality of the customized digital component. The pre-processing techniques can include using a foreground segmentation model to identify an object that is the subject of the digital component in the image and to mask the background of the original image. Masking the image in this way can prevent unwanted content from the original image being included in the customized digital component, which can prevent the image editing model from including unwanted artifacts in the edited image. These pre-processing techniques can be used to preserve the fidelity of the object and to only remove the portions from the image that will be regenerated. Without mask editing, the object may not match the item that is the subject of the digital component. The post-processing can include determining whether the customized digital component includes one or more errors associated with the image generation and, if so, generating an updated image and updated digital component using the updated image.

As used throughout this document, the phrase "digital component" refers to a discrete unit of digital content or digital information (e.g., a video clip, audio clip, multimedia clip, gaming content, image, text, bullet point, artificial intelligence output, language model output, or another unit of content). A digital component can electronically be stored in a physical memory device as a single file or in a collection of files, and digital components can take the form of video files, audio files, multimedia files, image files, or text files and include advertising information, such that an advertisement is a type of digital component.

FIG. 1 is a block diagram of an example environment 100 in which customized digital component generation can be performed. The example environment 100 includes a network 102, such as a local area network (LAN), a wide area network (WAN), the Internet, or a combination thereof. The network 102 connects electronic document servers 104, user devices 106, digital component servers 108, and a service apparatus 110. The example environment 100 may include many different electronic document servers 104, user devices 106, and digital component servers 108.

The service apparatus 110 is configured to provide various services to client devices 106 and/or publishers of electronic documents 150. In some implementations, the service apparatus 110 can provide search services by providing responses to search queries received from client devices 106. For example, the services apparatus 110 can include a search engine and/or an AI agent or other chat agent that enables users to interact with the agent over the course of multiple conversational queries and responses. The service apparatus 110 can also distribute digital components to client devices 106 for presentation with the responses and/or with electronic documents 150. For example, another search service computer system can send component requests 112 to the service apparatus 110 and these component requests 112 can include one or more queries. The service apparatus 110 and component requests 112 are described in further detail below.

A client device 106 is an electronic device capable of requesting and receiving online resources over the network 102. Example client devices 106 include personal computers, gaming devices, mobile communication devices, digital assistant devices, augmented reality devices, virtual reality devices, and other devices that can send and receive data over the network 102. A client device 106 typically includes a user application, such as a web browser, to facilitate the sending and receiving of data over the network 102, but native applications (other than browsers) executed by the client device 106 can also facilitate the sending and receiving of data over the network 102.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

As illustrated, the client device 106 is presenting an electronic document 150. An electronic document is data that presents a set of content at a client device 106. Examples of electronic documents include webpages, word processing documents, portable document format (PDF) documents, images, videos, search results pages, and feed sources. Native applications (e.g., "apps" and/or gaming applications), such as applications installed on mobile, tablet, or desktop computing devices are also examples of electronic documents. Electronic documents can be provided to client devices 106 by electronic document servers 104 ("Electronic Doc Servers").

For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally (i.e., on the client device). Alternatively, or additionally, the client device 106 can initiate a request to execute the app, which is transmitted to a cloud server. In response to receiving the request, the cloud server can execute the application and stream a user interface of the application to the client device 106 so that the client device 106 does not have to execute the app itself. Rather, the client device 106 can present the user interface generated by the cloud server's execution of the app, and communicate any user interactions with the user interface back to the cloud server for processing.

Electronic documents can include a variety of content. For example, an electronic document 150 can include native content 152 that is within the electronic document 150 itself and/or does not change over time. Electronic documents can also include dynamic content that may change over time or on a per-request basis. For example, a publisher of a given electronic document (e.g., electronic document 150) can maintain a data source that is used to populate portions of the electronic document. In this example, the given electronic document can include a script, such as the script 154, that causes the client device 106 to request content (e.g., a digital component) from the data source when the given electronic document is processed (e.g., rendered or executed) by a client device 106 (or a cloud server). The client device 106 (or cloud server) integrates the content (e.g., digital component) obtained from the data source into the given electronic document to create a composite electronic document including the content obtained from the data source.

In some situations, a given electronic document (e.g., electronic document 150) can include a digital component script (e.g., script 154) that references the service apparatus 110, or a particular service provided by the service apparatus 110. In these situations, the digital component script is executed by the client device 106 when the given electronic document is processed by the client device 106. Execution of the digital component script configures the client device 106 to generate a request for digital components (referred to as a "component request"), which is transmitted over the network 102 to the service apparatus 110. For example, the digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the service apparatus 110 can use to select one or more digital components, or other content, provided in response to the request. The component request 112 is transmitted, by the client device 106, over the network 102 (e.g., a telecommunications network) to a server of the service apparatus 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the service apparatus 110. Similarly, event data specifying keywords associated with the electronic document ("document keywords") or entities (e.g., people, places, or things) that are referenced by the electronic document can also be included in the component request 112 (e.g., as payload data) and provided to the service apparatus 110 to facilitate identification of digital components that are eligible for presentation with the electronic document.

The event data can also include a search query that was submitted from the client device 106 to obtain a search results page or a response in a conversational user interface. For example, an AI agent or other form of a chat agent can provide a conversation user interface in which users can provide natural language queries, which can be in the form of prompts for a language model, and receive responses to the queries. The user can refine their expression of their informational needs as the conversation progresses and the AI agent can send component requests 112 with the update queries. In such examples, the AI agent can include a user session identifier in the component requests so that the service apparatus 110 can correlate queries included in multiple component requests 112 for the same user session with the AI agent and use this information in generating customized digital components.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The service apparatus 110 chooses digital components (e.g., third-party content, such as video files, audio files, images, text, gaming content, augmented reality content, and combinations thereof, which can all take the form of advertising content or non-advertising content) that will be presented with the given electronic document (e.g., at a location specified by the script 154) in response to receiving the component request 112 and/or using information included in the component request 112. In some implementations, choosing a digital component includes choosing a customizable digital component that can be customized based on various data, as described in more detail below.

In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106.

Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided. The described techniques are adapted to generate a customized digital component in a short amount of time such that these errors and user experience impact are reduced or eliminated.

In some implementations, the service apparatus 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. Additionally, or alternatively, the distribution parameters can include embeddings that can use various different dimensions of data, such as website details and/or consumption details (e.g., page viewport, user scrolling speed, or other information about the consumption of data). The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score, or some other specified value) that is used for evaluating the eligibility of the digital component for distribution/transmission (e.g., among other available digital components).

The identification of the eligible digital component can be segmented into multiple tasks 117*a*-117*c* that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118*a*-118*c* of the analysis back to the service apparatus 110. For example, the results 118*a*-118*c* provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The service apparatus 110 aggregates the results 118*a*-118*c* received from the set of multiple computing devices 114 and uses information associated with the aggregated results to select one or more digital components that will be provided in response to the request 112. For example, the service apparatus 110 can select a set of winning digital components (one or more digital components) based on the outcome of one or more content evaluation processes, as discussed below. In turn, the service apparatus 110 can generate and transmit, over the network 102, reply data 120 (e.g., digital data representing a reply) that enable the client device 106 to integrate the set of winning digital components into the given electronic document, such that the set of winning digital components (e.g., winning third-party content) and the content of the electronic document are presented together at a display of the client device 106. In some implementations, the client device 106 executes instructions included in the reply data 120, which configures and enables the client device 106 to obtain the set of winning digital components from one or more digital component servers 108. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

When the client device 106 receives the digital component data 122, the client device will render the digital component (e.g., third-party content), and present the digital component at a location specified by, or assigned to, the script 154. For example, the script 154 can create a walled garden environment, such as a frame, that is presented within, e.g., beside, the native content 152 of the electronic document 150. In some implementations, the digital component is overlayed over (or adjacent to) a portion of the native content 152 of the electronic document 150, and the service apparatus 110 can specify the presentation location within the electronic document 150 in the reply 120. For example, when the native content 152 includes video content, the service apparatus 110 can specify a location or object within the scene depicted in the video content over which the digital component is to be presented.

The service apparatus 110 can also include an artificial intelligence system 160 configured to autonomously generate digital components, either prior to a request 112 (e.g., offline) and/or in response to a request 112 (e.g., online or real-time). As described in more detail throughout this specification, the artificial intelligence ("AI") system 160 can collect online content about a specific entity (e.g., digital component provider or another entity) and summarize the collected online content using one or more language models 170, which can include large language models.

A large language model ("LLM") is a model that is trained to generate and understand human language. LLMs are trained on massive datasets of text and code, and they can be used for a variety of tasks. For example, LLMs can be trained to translate text from one language to another; summarize text, such as web site content, search results, news articles, or research papers; answer questions about text, such as "What is the capital of Georgia?"; create chatbots that can have conversations with humans; and generate creative text, such as poems, stories, and code.

The language model 170 can be any appropriate language model neural network that receives an input sequence made up of text tokens selected from a vocabulary and auto-regressively generates an output sequence made up of text tokens from the vocabulary. For example, the language model 170 can be a Transformer-based language model neural network or a recurrent neural network-based language model.

In some situations, the language model 170 can be referred to as an auto-regressive neural network when the neural network used to implement the language model 170 auto-regressively generates an output sequence of tokens. More specifically, the auto-regressively generated output is created by generating each particular token in the output sequence conditioned on a current input sequence that includes any tokens that precede the particular text token in the output sequence, i.e., the tokens that have already been generated for any previous positions in the output sequence that precede the particular position of the particular token, and a context input that provides context for the output sequence.

For example, the current input sequence when generating a token at any given position in the output sequence can include the input sequence and the tokens at any preceding positions that precede the given position in the output sequence. As a particular example, the current input sequence can include the input sequence followed by the tokens at any preceding positions that precede the given position in the output sequence. Optionally, the input and the current output sequence can be separated by one or more predetermined tokens within the current input sequence.

More specifically, to generate a particular token at a particular position within an output sequence, the neural network of the language model 170 can process the current input sequence to generate a score distribution, e.g., a probability distribution, that assigns a respective score, e.g., a respective probability, to each token in the vocabulary of tokens. The neural network of the language model 170 can then select, as the particular token, a token from the vocabulary using the score distribution. For example, the neural network of the language model 170 can greedily select the highest-scoring token or can sample, e.g., using nucleus sampling or another sampling technique, a token from the distribution.

As a particular example, the language model 170 can be an auto-regressive Transformer-based neural network that includes (i) a plurality of attention blocks that each apply a self-attention operation and (ii) an output subnetwork that processes an output of the last attention block to generate the score distribution.

The language model 170 can have any of a variety of Transformer-based neural network architectures. Examples of such architectures include those described in J. Hoffmann, S. Borgeaud, A. Mensch, E. Buchatskaya, T. Cai, E. Rutherford, D. d. L. Casas, L. A. Hendricks, J. Welbl, A. Clark, et al. Training compute-optimal large language models, arXiv preprint arXiv:2203.15556, 2022; J. W. Rac, S. Borgeaud, T. Cai, K. Millican, J. Hoffmann, H. F. Song, J. Aslanides, S. Henderson, R. Ring, S. Young, E. Rutherford, T. Hennigan, J. Menick, A. Cassirer, R. Powell, G. van den Driessche, L. A. Hendricks, M. Rauh, P. Huang, A. Glaese, J. Welbl, S. Dathathri, S. Huang, J. Uesato, J. Mellor, I. Higgins, A. Creswell, N. McAleese, A. Wu, E. Elsen, S. M. Jayakumar, E. Buchatskaya, D. Budden, E. Sutherland, K. Simonyan, M. Paganini, L. Sifre, L. Martens, X. L. Li, A. Kuncoro, A. Nematzadeh, E. Gribovskaya, D. Donato, A. Lazaridou, A. Mensch, J. Lespiau, M. Tsimpoukelli, N. Grigorev, D. Fritz, T. Sottiaux, M. Pajarskas, T. Pohlen, Z. Gong, D. Toyama, C. de Masson d'Autume, Y. Li, T. Terzi, V. Mikulik, I. Babuschkin, A. Clark, D. de Las Casas, A. Guy, C. Jones, J. Bradbury, M. Johnson, B. A. Hechtman, L. Weidinger, I. Gabriel, W. S. Isaac, E. Lockhart, S. Osindero, L. Rimell, C. Dyer, O. Vinyals, K. Ayoub, J. Stanway, L. Bennett, D. Hassabis, K. Kavukcuoglu, and G. Irving. Scaling language models: Methods, analysis & insights from training gopher. CORR, abs/2112.11446, 2021; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv:1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neclakantan, Pranav Shyam, Girish Sastry, Amanda Askell, et al. Language models are few-shot learners. arXiv preprint arXiv:2005.14165, 2020.

Generally, however, the Transformer-based neural network includes a sequence of attention blocks, and, during the processing of a given input sequence, each attention block in the sequence receives a respective input hidden state for each input token in the given input sequence. The attention block then updates each of the hidden states at least in part by applying self-attention to generate a respective output hidden state for each of the input tokens. The input hidden states for the first attention block are embeddings of the input tokens in the input sequence and the input hidden states for each subsequent attention block are the output hidden states generated by the preceding attention block.

In this example, the output subnetwork processes the output hidden state generated by the last attention block in the sequence for the last input token in the input sequence to generate the score distribution.

Generally, because the language model is auto-regressive, the service apparatus 110 can use the same language model 170 to generate multiple different candidate output sequences in response to the same request, e.g., by using beam search decoding from score distributions generated by the language model 170, using a Sample-and-Rank decoding strategy, by using different random seeds for the pseudo-random number generator that's used in sampling for different runs through the language model 170 or using another decoding strategy that leverages the auto-regressive nature of the language model.

In some implementations, the language model 170 is pre-trained, e.g., trained on a language modeling task that does not require providing evidence in response to user questions, and the service apparatus 110 (e.g., using AI system 160) causes the language model 170 to generate output sequences according to the pre-determined syntax through natural language prompts in the input sequence.

For example, the service apparatus 110 (e.g., AI system 160), or a separate training system, pre-trains the language model 170 (e.g., the neural network) on a language modeling task, e.g., a task that requires predicting, given a current sequence of text tokens, the next token that follows the current sequence in the training data. As a particular example, the language model 170 can be pre-trained on a maximum-likelihood objective on a large dataset of text, e.g., text that is publicly available from the Internet or another text corpus.

In some implementations, the AI system 160 can generate a prompt 172 that is submitted to the language model 170, and causes the language model 170 to generate the output sequences 174, also referred to simply as "output". The AI system 160 can generate the prompt in a manner (e.g., having a structure) that instructs the language model 170 to generate the output.

In some implementations, the AI system 160 can generate the prompt 172 based on collected and/or generated data, and the output 174 of the language model 170 can be a prompt for a machine learning model. In a particular example, the language model 170 can be trained to generate an image editing prompt that includes instructions for an image editing model to edit an input image based on data included in the prompt 172.

The image can include an image corresponding to a digital component that is going to be provided to a client device 106. For example, the service apparatus 110 can select a digital component in response to a component request 112, e.g., a component request 112 that includes a query received by a search engine, and identify a set of images corresponding to the digital component. In another example, the service apparatus 110 can select the digital component in response to a query received by the service apparatus 110 from a client device 106, e.g., a query being submitted to an AI agent or search interface of the service apparatus 110. In a particular example, the service apparatus 110 can store or have access to a set of images for each digital component, e.g., for each digital component indexed in the digital component database 116. The images for a digital component can include those than can be used to create customized digital components. A provider of a digital component can provide, to the service apparatus 110, images for use in generating customized digital components to the service apparatus 110.

In some implementations, the service apparatus 110, e.g., the AI system 160, can be configured to collect images corresponding to a digital component. For example, a digital component can be for a particular item, e.g., a particular product or service. The service apparatus 110 can be configured to crawl electronic documents for images of the item, search for images of the item, and/or extract images of the item from one or more image-based digital components for the item.

The data used to generate the prompt 172 can include digital component data related to the selected digital component and/or query data related to one or more queries. The digital component data can include data related to the digital component itself and/or a provider of the digital component. The data related to the digital component can include data extracted from the digital component or included with the digital component, e.g., metadata of the digital component. For example, the data related to the digital component can include a caption of an image corresponding to the digital component (e.g., the image for which the image editing prompt is being generated) if a caption is present, the item that is the subject of the digital component, distribution parameters for the digital component (e.g., keywords and/or location parameters), and/or other data related to the digital component. The data related to the digital component provider can include an identifier (e.g., name) of the provider, a distribution plan for digital components of the provider (e.g., a maximum amount to be provided over a given time period in response to the provider's digital components being sent to client devices 106), and/or other appropriate digital component provider information.

The query data can include one or more queries, e.g., one or more queries received from a user during a user session with an AI agent, or a current query received in a component request 112. For component requests 112, the one or more queries can include previous queries provided to the service apparatus 110 on behalf of the same user. The query data can also include contextual data that characterizes or is otherwise related to a context in which the one or more queries are received. The contextual data can include location data that indicates a coarse geographical location (e.g., state or region) of the client device 106 that submitted the queries, time data that indicates a time at which the query is sent or received, weather in the location of the client device 106, and/or other appropriate contextual data.

As described in more detail below, the AI system 160 can evaluate the digital component data and the query data and generate the prompt 172 based on the evaluation. For example, as described in more detail below, the AI system 160 can evaluate the query data and the digital component data to identify the user's intent for the queries and the digital component provider's intent for the digital component and generate a prompt 172 that aligns the intents. To do this, the AI system 160 can identify concepts related to the query data and concepts related to the digital component data, select matching concepts (or filter out mismatching concepts), and generate a prompt 172 based on the matching concepts.

In some implementations, the prompt 172 can include a caption for the image. If the caption is present in the image or in metadata for the image, the AI system 160 can include the caption in the prompt 172. If a caption is not present in the image, the AI system 160 can generate a caption based on the other digital component data.

The AI system 160 can include some or all of the query data and/or the digital component data in the prompt 172. For example, the AI system 160 can include the location of the client device 106 in the prompt 172 so that the language model 170 can generate an image editing prompt that includes the location or feature of the location (e.g., snow, mountains, cold, etc. if the location is Colorado. Rather than provide all of the query data and/or the digital component data to the language model 170, the AI system 160 can generate a specialized prompt that includes a smaller amount of selected or generated data resulting from the evaluation such that the resulting image editing prompts and their resulting images are more accurate, while also reducing the amount of data that is processed using the language model 170. This results in the creation of high quality images in a short amount of time such that the images can be created at query time without causing page load errors or user frustration.

In some implementations, the prompt 172 provided to the language model 170 can include instructions for generating the image editing prompt. For example, the instructions can be to include, in the image editing prompt, particular instructions for the image editing model. In a particular example, the instructions can be to not include text in the edited image or to not show people in the edited image.

The instructions included in the prompt 172 can also include instructions on how to use the other data that is included in the prompt 172. For example, the instructions can indicate that the image editing prompt is to instruct the image editing model to generate a background based on the client device location and/or the weather. In another example, the instructions can be to identify concepts related to the one or more queries and/or the digital component data and to edit the image in a way that conveys those concepts.

The language model 170 can be trained to generate the image editing prompt in a manner (e.g., having a structure) that is based on the data included in the prompt 172. The image editing prompt can also include the name or type of the item depicted in the image corresponding to the digital component. The image editing prompt can also include instructions for an image editing model to edit the image based on the other information in the image editing prompt 172.

As described in more detail below, the AI system 160 can provide the image editing prompt and the image, or a masked version of the image, to an image editing model. The image editing model can generate an edited image that the AI system 160 can use to generate a customized digital component for the user.

As an example, assume that the AI system 160 is generating a customized digital component to provide in response to a query received from a user. In this example, the AI system 160 can generate the prompt 172 to include a set of instructions for generating an image editing prompt that is based on the query (and/or previous queries received from the user), contextual data related to the query or queries, and digital component data for the digital component.

Additionally, the AI system 160 can process the image to generate an image mask of a foreground object (e.g., an item that is the subject of the digital component). For example, the AI system 160 can process an image of a vehicle to generate an image mask of the vehicle.

The AI system 160 can then process the image, the image editing prompt, and the image mask using an image editing model to generate a customized image, as described in more detail with reference to FIG. 2. The customized image can include the foreground object with a specialized background that is based on the user's intent and the digital component provider's intent using the query data and the digital component data. Continuing the previous vehicle example, the customized image can be an image that depicts the vehicle in the foreground of the image with a background based on the user and digital component provider intent.

For example, if the vehicle is a truck and the digital component provider's intent is for the truck to be a rugged offroad truck and the user intent is for trucks that can be driven in Colorado, the resulting image can be the truck shown driving on a mountain road covered in snow. In this example, the prompt to the language model 170 to generate the image editing prompt can be "generate image description to show <car title provided by digital component provider> in Colorado", and the language model 170 can output, as an image editing prompt, "<car title> on a mountain road with snow covered peaks in background." In this example, "car title" is the name of the item that is the subject of the digital component for which the image is being generated.

In another example, the user's query can be "waterproof backpacks" and the AI system 160 can generate an image that depicts a backpack that is the subject of a digital component of a digital component provider with a rainy background. In this example, the prompt provided to the language model 170 can be "give an image description to match intent of query waterproof backpacks for the product <backpack product title>" and the language mode can output, as an image editing prompt, "<backpack product title> on a rock with clouds and rain in background." In this example, "backpack product title" is the name of the item that is the subject of the digital component for which the image is being generated.

In some examples, the AI system 160 can perform one or more post-processing operations that evaluate one or more characteristics of the generated customized image, as discussed in more detail with reference to FIG. 2.

The AI system 160 can generate a customized digital component based on the customized image and send the customized digital component to the client device 106 as a reply 120. For example, the AI system 160 can add a caption to the customized image and/or generate a digital component creative file that includes the image, metadata, and/or code of a digital component.

Furthermore, although a single language model 170 is shown in FIG. 1, different language models can be specially trained to process different prompts at different stages of the processing pipeline. For example, a more general (e.g., larger) language model can be used to generate the caption of the image as an offline process (e.g., independent of receipt of the request 112), which can then be inserted into prompts that are input to a more specialized and faster language model in an online process (e.g., real-time in response to receiving the request 112.

Figure 2:
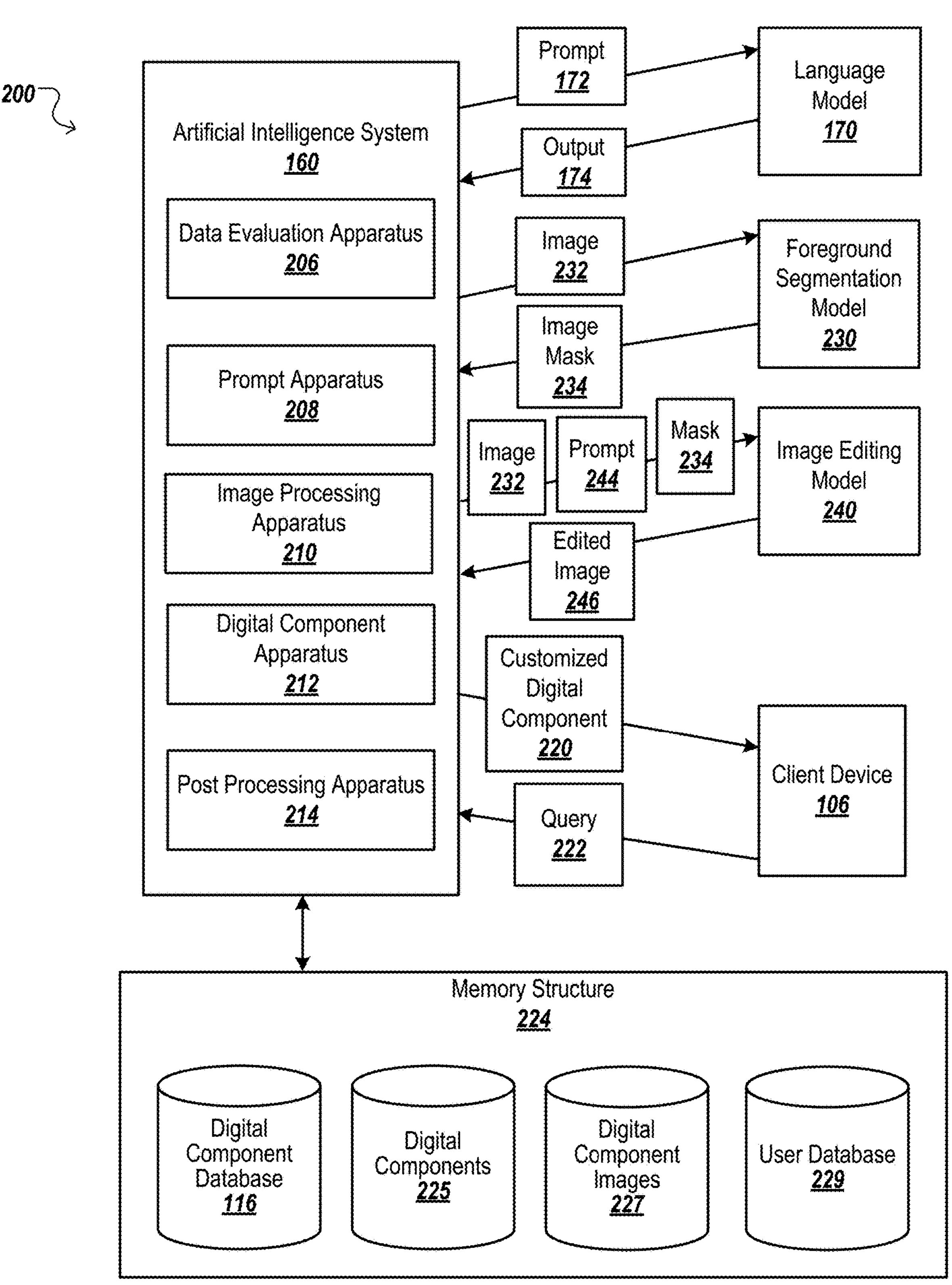
FIG. 2 is a block diagram illustrating interactions between an artificial intelligence system, a language model, a foreground segmentation model, an image editing model, and a client device.

FIG. 2 is a block diagram illustrating interactions between an artificial intelligence system 160, a language model 170, a foreground segmentation model 230, an image editing model 240, and a client device 106.

The AI system 160 can include a data evaluation apparatus 206, a prompt apparatus 208, an image processing apparatus 210, a digital component apparatus 212, and a post processing apparatus 214. The AI system 160 can also include or be configured to interact with a memory structure 224 to extract and/or store information and content. In particular, the memory structure 224 can store the digital component database 116, digital components 225, images 227 corresponding to the digital components, and a user database 229. The memory structure 224 can include one or more databases or other data structures stored on one or more memories and/or data storage devices.

As described above, the digital component database 116 can include distribution parameters for digital components 225. The distribution parameters for a digital component 225 can include, for example, keywords and/or geographic locations for which the digital component 225 is eligible to be distributed to client devices 106. The digital component database 116 can also include, for each digital component 225, metadata of the digital component, a caption for each image 227 corresponding to the digital component, data related to the digital component provider that provides the digital component, and/or other data related to the digital component. As described above, the data related to the digital component provider can include an identifier (e.g., name) of the provider, a distribution plan for digital components of the provider (e.g., a maximum amount to be provided over a given time period in response to the provider's digital components being sent to client devices 106), and/or other appropriate digital component provider information.

The digital components 225 can include candidate digital components that can be provided in response to component requests 112 and/or queries received by the service apparatus 110. The images 227 can include one or more images for each digital component 225. As described above, the AI system 160 can obtain images for digital component 225 from the digital component providers or from other sources. The AI system 160 can use the images 227 to generate customized digital components, as described herein.

The user database 229 can store information related to users. The information can include, for example, queries received from the user, e.g., in component requests 112 and/or queries sent to the service apparatus 110 for an AI agent provided by the service apparatus 110. The AI system 160 can indicate, in the user database 229, which queries are from past user sessions and which queries are from a current user session. The user session can be a user session with a search system (e.g., a search engine of the service apparatus 110 or an external search engine that submits component requests) or an AI agent.

A user session can be defined by a start event and an end event. The start event can be the opening or launching of the search interface at the client device 106 or receipt of a first query from the client device 106. For example, the start event can be when the user navigates to a search interface provided in a web page or the opening of a native application that includes the search interface. The end event can be the closing of the search interface or a navigation from the web page that includes the search interface. The end event can also be based on a duration of time since a last query has been received. For example, the AI system 160 can determine that a user session has ended if no queries are received from the client device 106 for at least a threshold period of time, e.g., five minutes, ten minutes, one hour, or another time period.

In some implementations, the user information can include user interest information that indicates interests of the user. For example, a user may provide, to the search apparatus 110, a list of interests. In another example, the AI system 160 can infer user interests of a user, e.g., based on queries received from the user.

The AI system 160 can receive a query 222 from a client device 106 of a user. The AI system 160 can select a digital component 225 based at least in part on the query 222. For example, the AI system 160 can select a digital component 225 based on the query 222 matching a keyword of the distribution parameters for the digital component 225. The AI system 160 can select the digital component 225 based on previous queries from the user and/or other information, as described herein. The AI system 160 can also obtain an image 232 corresponding to the selected digital component 225 from the memory structure 224. If there are multiple images 227 for the selected digital component stored in the memory structure 234, the AI system 160 can select an image 232 from the multiple images 227, e.g., based on the query 222.

The data evaluation apparatus 206 is configured to evaluate digital component data for the selected digital component 225 and/or query data for one or more queries received from the user, including the query 222. The one or more queries can include queries received during the current user session and/or queries received during previous user sessions of the user. As described above, the query data can include the one or more queries and contextual data related to the one or more queries. The data evaluation apparatus 206 can obtain the digital component data from the memory structure 224.

The data evaluation apparatus 206 can evaluate the digital component data and/or the query data to generate data to be included in a prompt 172 for the language model 170. In some implementations, the data evaluation apparatus 206 can generate, as the data to be included in the prompt 172 ("prompt data"), a caption for the image 232 based on a title or name of the item that is the subject of the digital component and shown in the image 232. For example, the caption can be the title or name of the item. The title or name of the item can be included in the digital component data for the digital component 225 and/or metadata of the image 232

In some implementations, the data evaluation apparatus 206 can determine concepts from the query data and the digital component data and use the concepts to generate the prompt data. The concepts determined from the query data can serve as a proxy for, or representation of, the user's intent. Similarly, the concepts determined from the digital component data can serve as a proxy for, or representation of, the digital component provider's intent.

The data evaluation apparatus 206 can determine the concepts related to the digital component data based on the digital component data 225 and/or the image 232. For example, the data evaluation apparatus 206 can evaluate the image 232 to determine one or more concepts related to the image 232. In some implementations, the data evaluation apparatus 206 can provide the image 232 to a machine learning model (e.g., neural network) trained to process images and output concepts found in the images. The data evaluation apparatus 206 can also evaluate the distribution parameters for the digital component and/or digital component provider data to identify concepts related to the digital component. For example, each keyword may be a concept.

In another example, the data evaluation apparatus 206 can provide the keywords, location and/or other distribution parameters and/or digital component provider data to a machine learning model (e.g., neural network) trained to process such data and output concepts found in the data.

The data evaluation apparatus 206 can determine the concepts related to the query data based on the query data (e.g., the received query 222, the one or more previous queries, and/or the contextual data for the queries) and optionally the user information for the user that submitted the query. For example, the data evaluation apparatus 206 can provide the query data and the user information to a machine learning model (e.g., neural network) trained to process such data and output concepts found in the data.

The data evaluation apparatus 206 can evaluate the concepts related to the digital component data and the query data to identify matching concepts and/or mismatching concepts. Concepts do not have to be an exact match to be considered a match. For example, a concept related to the query data can be "snow" while a concept related to the digital component data can be "winter." While the words are not an exact match, the data evaluation apparatus 206 can determine that they match based on the concepts being similar (e.g., having a threshold similarity score) or being related to the same higher level concept. A mismatching concept is a concept for either the query data or the digital component data that does not match a concept for the other of the query data or the digital component data.

The data evaluation apparatus 206 can combine the concepts for the query data and the digital component data into a set of concepts. The data evaluation apparatus 206 can filter, from this set of concepts, mismatching concepts or mismatching concepts that have at least a threshold level of importance. For example, if the data evaluation apparatus 206 identifies a mismatching concept, the data evaluation apparatus 206 can determine an importance of that concept to the user, the queries, to the digital component provider, or to a combination of two or more of these entities. In a particular example, if there is a mismatching concept found in the concepts for the digital component data, the data evaluation apparatus 206 can determine whether that concept is applicable to the item that is the subject of the selected digital component 225 or another item of the digital component provider. If not, the data evaluation apparatus 206 can determine that the concept is of low importance and filter the concept from the set of concepts.

In another example, the data evaluation apparatus 206 can provide the mismatching concept, the query data, the digital component data, and optionally other data related to the user, the queries, the selected digital component 225, and/or the digital component provider to a machine learning model (e.g., neural network or language model 170) trained to output an importance value that indicates the importance of the concept. In this example, the data evaluation apparatus 206 can filter the concept from the set of concepts if the importance value is less than or equal to a threshold.

By removing mismatching concepts in this way, the prompt 172 provided to the LLM does not include irrelevant concepts that could cause the language model 170 to generate an image editing prompt 244 that includes a background or other features that are not related to the user intent or the digital component provider intent. This results in higher quality images for the customized digital components that more accurately convey the intent of both the user and the digital component provider.

In some implementations, the data evaluation apparatus 206 determines the concepts for the digital component data of the digital components 225 in an offline process. In this way, the amount of processing performed after receiving the query and before sending the customized digital component 220 to the client device 106 can be reduced, resulting in less latency and fewer page load errors due to delayed receipt of digital components at client devices 106.

The prompt apparatus 208 is configured to generate a prompt 172 for the language model using the caption and/or the concepts remaining in the set of concepts after the filtering. For example, the prompt 172 can include a caption generated by the data evaluation apparatus 206 or a caption found in the image 232 and instructions for creating a background. The instructions for creating the background can be based on a location, e.g., the location of the client device 206 of the user or a location found in the distribution parameters for the digital component. For example, if the location of the client device 206 matches a location found in the distribution parameters, that matching location can be used. In another example, the background instructions can include a particular season (e.g., the current season of the year), a particular occasion (e.g., an upcoming event of interest to the user) and/or an upcoming holiday. For example, if the location is New York and it's in December, the background instructions can include "New York and Christmas."

The prompt apparatus 208 can provide the prompt 172 as an input to the language model 170. The AI system 160 can use the language model 170 to process the prompt and provide an image editing prompt 244 as an output 174. In general, the image editing prompt 244 includes instructions for editing the image 232 using the image mask 234 to include a specialized background based on the caption and/or concepts provided to the language model 170.

In some implementations, the image editing prompt 244 can include clauses generated by the language model 170 or by the prompt apparatus 208 using a template. For example, the image editing prompt 244 could take the following forms: "<current query> with <location> in background" or "<item> with <client device location> in background."

The image processing apparatus 210 can process the image 232 to segment an object corresponding to the item that is the subject of the digital component from the image. In some implementations, the AI system 160 can use the foreground segmentation model 230 to process the image to generate an image mask 234 of a foreground object (e.g., the item). In this example, the AI system 160 can provide the image 232 to the foreground segmentation model 230 and receive, from the foreground segmentation model, the image mask. The foreground segmentation model 230 can be implemented as a neural network or other appropriate machine learning model trained to detect objects in images and generate an image mask that segments the object from the remaining portions of the image.

The image mask 234 can include a blank background with an area corresponding to the object indicated in the image mask 234. For example, the blank background can be a first color and the area corresponding to the object can be a second color. In another example, the blank background can be a first color and the object can remain in its original form in the image mask 234. In a particular example, the image processing apparatus 210 can process an image of a vehicle to generate an image mask of the vehicle. In the image mask, the area previously occupied by the vehicle can be shown in one color (or can remain in original form) and the remaining portions of the image can be shown in another color. In some implementations, the image processing apparatus 210 can generate the image masks 234 for the images 227 in an offline process. In this way, the amount of processing performed after receiving the query and before sending the customized digital component 220 to the client device 106 can be reduced, resulting in less latency and fewer page load errors due to delayed receipt of digital components at client devices 106.

The image processing apparatus 210 can then process the image 232, the image editing prompt 244, and the image mask 234 to generate an edited image 256, which can also be referred to as a customized image. In some implementations, the image processing apparatus 210 uses an image editing model 240 to process the image 232, the image editing prompt 244, and the image mask 234 to generate an edited image that includes a specialized background based on the image editing prompt 244. The image editing model 240 can be implemented as a text to image machine learning model, e.g., a text to image neural network or other type of machine learning model.

For example, the image editing model 240 can generate the specialized background using the image mask 234 and the instructions included in the image editing prompt 244, and overlay the segmented foreground object in the area for the object in the image mask 234. In other words, the image editing model 240 can populate the portion of the image mask 234 for the background with a specialized background generated based on the image editing prompt 244 and populate the area for the object with the segmented image of the object.

The specialized background can be related to the user intent and/or the digital component provider intent based on the image editing prompt 244 generated based on the concepts, as described above. For example, the edited image 246 can be an image that depicts an item in the foreground of the image with a background of a location of the client device 106. For example, the AI system 160 can generate a customized image digital component with a vehicle in the foreground and a mountainous region in the background based on the client device location being in a mountainous region.

The digital component apparatus 212 can generate a customized digital component 220 using the edited image 246. For example, the digital component apparatus 212 can generate a creative file that contains all of the information and content for the client device 106 to render the customized digital component 220. The digital component apparatus 212 can also add a caption to the edited image 246, e.g., using the caption from the image 232 or a generated caption based on the query data and/or the digital component data.

The digital component apparatus 212 can provide the customized digital component 220 to the client device 106. In some implementations, the post processing apparatus 214 can perform one or more post-processing operations that evaluate one or more characteristics of the edited image 220 prior to the customized digital component 220 being sent to the client device 106 or after as part of a quality control procedure. In general, the post processing operations can be used to ensure that the edited images generated by the AI system 160 are of high quality and accurately convey the intent of the users and/or digital component providers.

The post processing apparatus 214 can be configured to detect whether the edited image 220 includes one or more errors. The one or more errors can be associated with the size and/or orientation of the object in the image 232 or in the image mask 234. For example, the object may be uncentered relative to the background of the image, or the object may be relatively small in comparison to the background of the image 234. In some other examples, the image mask 234 may be generated over (e.g., overlapping with) the original foreground object in the image. In other words, the edited image 246 can depict a first instance of object in the area for the object within the image mask 234 and another instance of the object within that first instance of the object. In this example, the post processing apparatus 214 can adjust the object within the background by centering the location of the object within the background, resizing the object, or both.

The image processing apparatus 210 can also be configured to perform these steps for other images prior to generating an image mask for the image. For example, the image processing apparatus 210 can be configured to center the object in the image and increase the size of the object in the image, e.g., be zooming in on the object if the object is too small and/or panning the image such that the object is located near the center of the image.

In some examples, the one or more errors can be associated with text being included in the edited image 246. For example, the background of the original image can include text associated with the foreground object, and the foreground segmentation model 230 may not always generate the image mask 234 without including the text. In this example, the post processing apparatus 214 can implement a review of the edited image 246 to determine how to adjust the image 246. In another example, the post processing apparatus 214 can be configured to detect text in the edited image 246, e.g., using optical character recognition (OCR), and remove any detected text.

In some examples, the one or more errors can be associated with the background of the edited image 246. For example, the image editing model may not generate a background that accurately conveys the user intent or digital component provider intent. In this example, a post processing apparatus 214 can implement a review of the edited image to determine how to adjust the image (e.g., by editing the prompt 172 and/or the image editing prompt 244).

For example, the post processing apparatus 214 can evaluate the edited image 246 to determine one or more concepts conveyed by the edited image 246. In some implementations, the post processing apparatus 214 can provide the edited image 246 to a machine learning model (e.g., neural network) trained to determine concepts found in images. In this example, the post processing apparatus 214 can compare the concepts output by the machine learning model to the concepts identified by the data evaluation apparatus 206. In another example, the post processing apparatus 214 can provide the edited image 246 and the prompt 172, and/or the prompt 244 to a machine learning model (e.g., a language model 170) with a prompt to evaluate whether the image matches the prompt(s). In either example, if the concepts do not match, the post processing apparatus 214 can send the edited image 246 for review or to the prompt apparatus 208, along with the concepts identified for the edited image 246.

The prompt apparatus 208 can be configured to update the prompt 172 based on the concepts identified in the edited image 246. For example, the prompt apparatus 208 can remove or adjust concepts from the set of concepts if those concepts are causing the models to generate a background that does not match the other concepts in the set of concepts.

In some other examples, the one or more errors can be associated with the border of the customized image. In this case, the post processing apparatus 214 can implement a review of the edited image 246 to determine how to adjust the edited image (e.g., by cropping the edited image).

Figure 3:
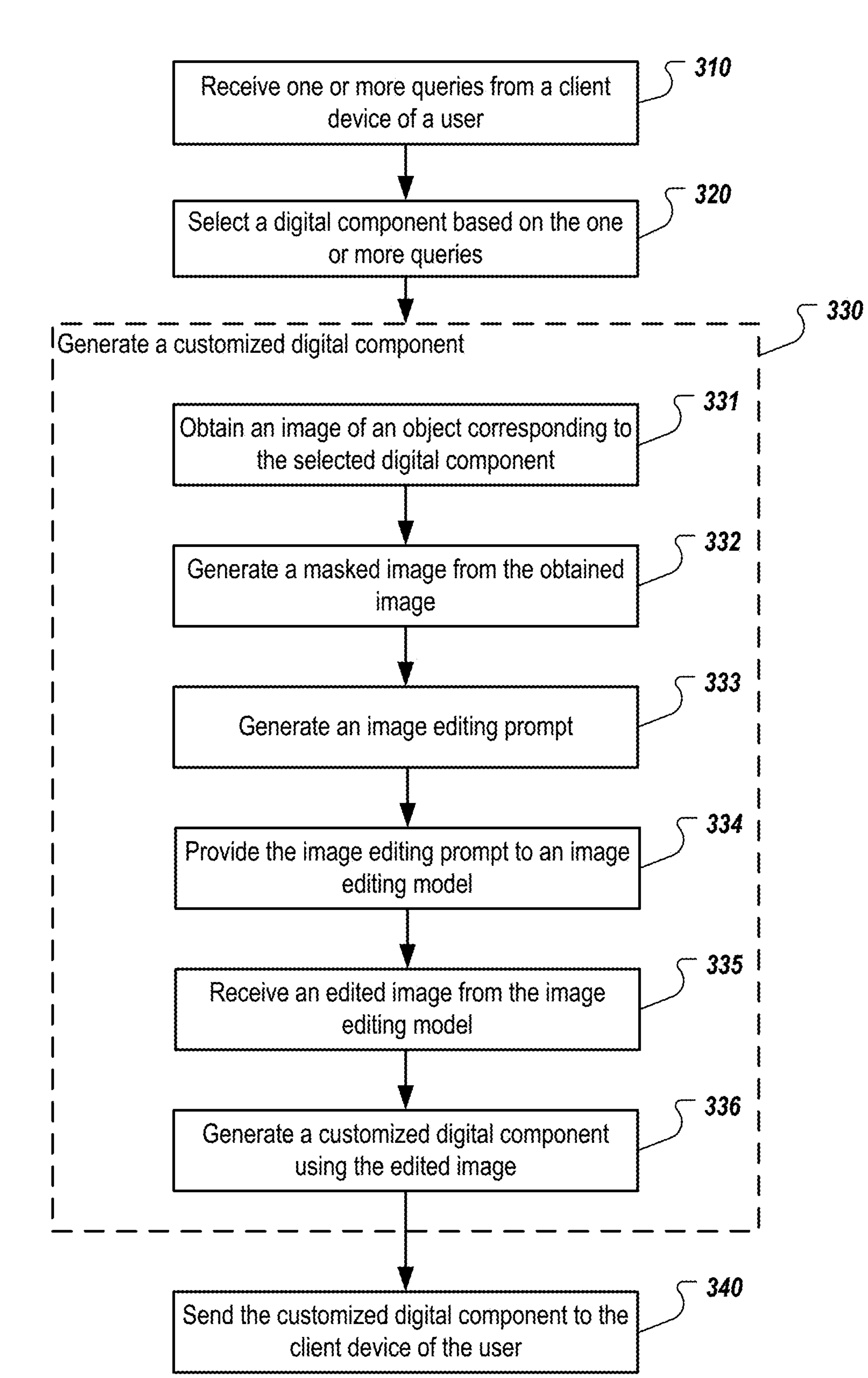
FIG. 3 is a flow chart of an example process of generating a customized digital component.

FIG. 3 is a flow chart of an example process 300 of generating a customized digital component. Operations of the process 300 can be performed, for example, by the service apparatus 110 of FIG. 1 (e.g., by the AI system 160), or another data processing apparatus. The operations of the process 300 can also be implemented as instructions stored on a computer readable medium, which can be non-transitory. Execution of the instructions, by one or more data processing apparatus, causes the one or more data processing apparatus to perform operations of the process 300. For brevity, the process 300 is described in terms of being performed by a system.

The system receives one or more queries from a client device of a user (310). The one or more queries can include a current query, past queries from one or more past user sessions, other queries from the current user session, or any combination of these queries.

The system selects a digital component based on the one or more queries (320). As described above, a digital component can be selected based on queries and distribution parameters for digital components. For example, the system can identify eligible digital components that have a keyword distribution parameter that matches at least one of the one or more queries. The system can then select one of the eligible digital components based on additional information, e.g., a selection value for each eligible digital component.

The system generates a customized digital component based on the selected digital component (330). The system can generate the customized digital component using constituent operations 331-336.

The system obtains an image corresponding to the selected digital component (331). As described above, images that can be used to generate customized digital components for each digital component can be stored in a memory structure and obtained when generating a customized image.

The system generates an image mask using the obtained image (332). The image mask segments a foreground object (e.g., an item that is the subject of the digital component) and the background of the image. The image mask can mask the background in the image, e.g., by using a single color to represent the background. In some implementations, the system uses an image segmentation model to generate the image mask. The masking is optional, but can improve the quality of the edited image.

The system generates an image editing prompt using a language model (333). The system can generate the image editing prompt based on a caption of the obtained image, digital component data for the selected digital component, query data for the one or more queries (which can include user information for the user that submitted the one or more queries), and/or other information. For example, as described above, the system can generate a prompt for the language model using concepts extracted from the digital component data and/or concepts extracted from the query data. The language model can process the prompt and return an image editing prompt for editing the obtained image.

The system provides the image, the image editing prompt, and optionally the image mask to an image editing model (334). The image editing model can be trained to edit images based on input prompts and input images. For example, the image editing model can be a text to image neural network. The image editing model can be used to process the image, the image editing prompt, and the image mask to generate an edited image. In some implementations, the system can provide the image editing prompt and the image mask as the image. For example, the image mask can include the image of the item with the background masked, as described above. The system receives, from the image editing model, an edited image (335).

The system generates a customized digital component using the edited image (336). For example, as described above, the system can generate a digital component creative file that includes all of the information and content for the client device to render the customized digital component. The information and content can include, for example, the edited image, metadata, and/or code of the selected digital component.

The system sends the customized digital component to the client device of the user (340). The client device can then display the customized digital component to the user.

Figure 4:
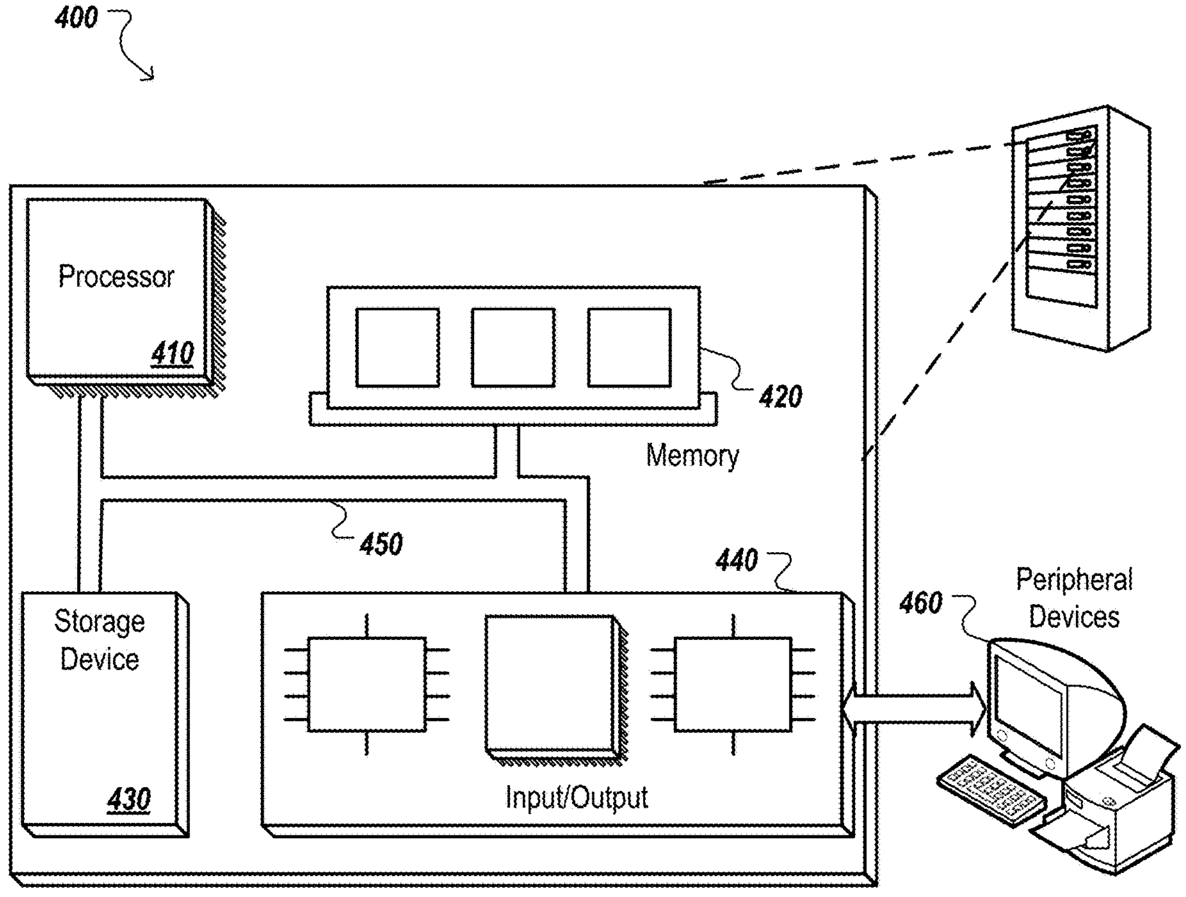
FIG. 4 a block diagram of an example computer.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

For situations in which the systems discussed here collect and/or use personal information about users, the users may be provided with an opportunity to enable/disable or control programs or features that may collect and/or use personal information (e.g., information about a user's social network, social actions or activities, a user's preferences, or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:

receiving one or more queries from a client device of a user;

selecting a digital component based on the one or more queries;

generating a customized digital component for the user, the generating comprising:

obtaining an image of an object corresponding to the selected digital component;

generating, using a language model, an image editing prompt for editing the image based on (i) digital component data related to the digital component and (ii) query data comprising the one or more queries and contextual data that characterizes a context in which the one or more queries are received from the client device;

identifying mismatching concepts among one or more first concepts identified based on the digital component data and one or more second concepts identified from the query data;

filtering the mismatching concepts, wherein filtering the mismatching concepts comprises filtering only a portion of the mismatching concepts based on a level of importance of each mismatching concept;

providing the image and the image editing prompt to an image editing model that is trained to edit images based on input prompts and input images;

receiving, from the image editing model, an edited image; and generating the customized digital component using the edited image; and sending the customized digital component to the client device of the user.

2. The method of claim 1, further comprising generating an image mask by masking a background depicted in the image, wherein providing the image and the image editing prompt to the image editing model comprises providing, as the image, the image mask to the image editing model.

3. The method of claim 2, wherein generating the image mask comprises providing the image to a foreground segmentation neural network trained to segment foreground objects from backgrounds in images and receiving the image mask from the foreground segmentation neural network.

4. The method of claim 1, wherein the one or more queries comprise past queries from one or more past user sessions of the user, current queries from a current user session of the user, or both.

5. The method of claim 1, wherein the data related to the digital component comprises distribution parameters for the digital component, the distribution parameters comprising one or more keywords, one or more geographic locations, or both.

6. The method of claim 1, wherein the data related to the digital component comprises a caption depicted in the image.

7. The method of claim 1, wherein the contextual data comprises at least one of a geographic location of the client device or one or more interests of the user.

8. The method of claim 1, further comprising post processing the customized digital component prior to sending the customized digital component to the client device, the post processing comprising detecting one or more errors in the edited image and updating the edited image to correct the one or more errors prior to generating the customized digital component using the edited image.

9. The method of claim 1, wherein generating, using the language model, an image editing prompt comprising providing, to the language model, a prompt generation prompt comprising instructions for generating the image editing prompt and a set of concepts identified from the digital component data and the query data.

10. The method of claim 9, wherein the prompt generation prompt comprises a caption of the image.

11. A system comprising:

one or more processors; and one or more storage devices storing instructions that, when executed by the one or more processors, cause the one or more processors to perform operations comprising:

receiving one or more queries from a client device of a user;

selecting a digital component based on the one or more queries;

generating a customized digital component for the user, the generating comprising:

obtaining an image of an object corresponding to the selected digital component;

generating, using a language model, an image editing prompt for editing the image based on (i) digital component data related to the digital component and (ii) query data comprising the one or more queries and contextual data that characterizes a context in which the one or more queries are received from the client device;

identifying mismatching concepts among one or more first concepts identified based on the digital component data and one or more second concepts identified from the query data;

filtering the mismatching concepts, wherein filtering the mismatching concepts comprises filtering only a portion of the mismatching concepts based on a level of importance of each mismatching concept;

providing the image and the image editing prompt to an image editing model that is trained to edit images based on input prompts and input images;

receiving, from the image editing model, an edited image; and generating the customized digital component using the edited image; and sending the customized digital component to the client device of the user.

12. The system of claim 11, wherein the operations comprise generating an image mask by masking a background depicted in the image, wherein providing the image and the image editing prompt to the image editing model comprises providing, as the image, the image mask to the image editing model.

13. The system of claim 12, wherein generating the image mask comprises providing the image to a foreground segmentation neural network trained to segment foreground objects from backgrounds in images and receiving the image mask from the foreground segmentation neural network.

14. The system of claim 11, wherein the one or more queries comprise past queries from one or more past user sessions of the user, current queries from a current user session of the user, or both.

15. The system of claim 11, wherein the data related to the digital component comprises distribution parameters for the digital component, the distribution parameters comprising one or more keywords, one or more geographic locations, or both.

16. The system of claim 11, wherein the data related to the digital component comprises a caption depicted in the image.

17. A non-transitory computer readable storage medium carrying instructions that, when executed by one or more processors, cause the one or more processors to perform operations comprising:

receiving one or more queries from a client device of a user;

selecting a digital component based on the one or more queries;

generating a customized digital component for the user, the generating comprising:

obtaining an image of an object corresponding to the selected digital component;

generating, using a language model, an image editing prompt for editing the image based on (i) digital component data related to the digital component and (ii) query data comprising the one or more queries and contextual data that characterizes a context in which the one or more queries are received from the client device;

identifying mismatching concepts among one or more first concepts identified based on the digital component data and one or more second concepts identified from the query data;

filtering the mismatching concepts, wherein filtering the mismatching concepts comprises filtering only a portion of the mismatching concepts based on a level of importance of each mismatching concept;

providing the image and the image editing prompt to an image editing model that is trained to edit images based on input prompts and input images;

receiving, from the image editing model, an edited image; and generating the customized digital component using the edited image; and sending the customized digital component to the client device of the user.

* * * * *